(12) United States Patent
Rana et al.

(10) Patent No.: US 10,010,866 B1
(45) Date of Patent: Jul. 3, 2018

(54) NITROGEN AND PHOSPHORUS CO-DOPED CRYSTALLINE CARBON MATERIALS

(71) Applicant: KING SAUD UNIVERSITY, Riyadh (SA)

(72) Inventors: Usman Ali Rana, Riyadh (SA); Arfat Anis, Riyadh (SA); Ayman Nafady, Riyadh (SA); Saeed M. Al-Zahrani, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/709,330

(22) Filed: Sep. 19, 2017

(51) Int. Cl.
| | | |
|---|---|---|
| *B01J 21/18* | (2006.01) | |
| *C10B 53/02* | (2006.01) | |
| *B01J 37/08* | (2006.01) | |
| *B01J 27/14* | (2006.01) | |
| *B01J 37/04* | (2006.01) | |
| *B01J 27/24* | (2006.01) | |

(52) U.S. Cl.
CPC ............... *B01J 21/18* (2013.01); *B01J 27/14* (2013.01); *B01J 27/24* (2013.01); *B01J 37/04* (2013.01); *B01J 37/084* (2013.01); *C10B 53/02* (2013.01)

(58) Field of Classification Search
CPC ... B01J 21/18; B01J 27/14; B01J 27/24; B01J 37/04; B01J 37/084; C10B 53/02
USPC ........................................ 502/180, 200, 208
See application file for complete search history.

(56) References Cited

U.S. PATENT DOCUMENTS

| 3,087,126 A | 3/1963 | Chang | |
|---|---|---|---|
| 9,643,165 B2 * | 5/2017 | Viswanathan | ........... B01J 27/24 |
| 2012/0177995 A1 | 7/2012 | Sun et al. | |

(Continued)

FOREIGN PATENT DOCUMENTS

| CN | 10-4355299 | * | 2/2015 | ............. C01B 31/00 |
|---|---|---|---|---|
| CN | 10-4437278 | * | 3/2015 | ............. B01J 13/00 |

(Continued)

OTHER PUBLICATIONS

"Nitrogen/phosphorus co-doped nonporous carbon nanofibers for high-performance supercapacitors," Xiadong Yan et al. Journal of Power Sources 248 (2014), pp. 745-751.*

(Continued)

*Primary Examiner* — Patricia L. Hailey
(74) *Attorney, Agent, or Firm* — Richard C. Litman

(57) ABSTRACT

The nitrogen and phosphorus co-doped crystalline carbon materials are prepared by a template-free method that includes pyrolyzing a precursor mixture including a carbon source, a nitrogen source, and a phosphorus source. The method involves mixing known amounts of the precursor components, dissolving the precursor mixture in deionized water, distilling solvent from the aqueous mixture, and vacuum drying the residue to a dry solid mixture. The mixture is then carbonized by pyrolysis at 900° C. in an argon atmosphere to obtain a nitrogen and phosphorus co-doped crystalline carbon material. The principles of the method are illustrated by a precursor mixture of sucrose, urea, and ammonium dihydrogen phosphate ($NH_4H_2PO_4$). The amount of ammonium salt in the precursor mixture plays a key role in controlling the crystallinity, morphology, and composition of the N/P co-doped crystalline carbon material.

12 Claims, 11 Drawing Sheets

(56) References Cited

U.S. PATENT DOCUMENTS

| | | | |
|---|---|---|---|
| 2013/0157838 A1* | 6/2013 | Viswanathan | B01J 27/24 502/5 |
| 2014/0087268 A1 | 3/2014 | Kim et al. | |
| 2014/0150713 A1 | 6/2014 | Coe et al. | |
| 2014/0353144 A1 | 12/2014 | Nakanishi et al. | |
| 2015/0206739 A1 | 7/2015 | Manna et al. | |
| 2016/0172481 A1 | 6/2016 | MacMillan et al. | |
| 2017/0203284 A1* | 7/2017 | Viswanathan | B01J 27/24 |

FOREIGN PATENT DOCUMENTS

| | | | | |
|---|---|---|---|---|
| CN | 10-4987863 | * | 10/2015 | B82Y 20/20 |
| CN | 10-5226296 | * | 1/2016 | B01J 27/24 |
| CN | 10-6000438 | * | 10/2016 | B01J 21/18 |

OTHER PUBLICATIONS

"Sustainable synthesis of phosphorus- and nitrogen-co-doped porous carbons with tunable surface properties for supercapacitors," Chunlei Wang et al. Journal of Power Sources 239 (2013), pp. 81-88.*

"Nitrogen, phosphorus and iron doped carbon nanospheres with high surface area and hierarchical porous structure for oxygen reduction," Xiaochang Qiao et al. Journal of Power Sources 288 (2015), pp. 253-260.*

Choi et al., "Phosphorus-nitrogen dual doped carbon as an effective catalyst for oxygen reduction reaction in acidic media: effects of the amount of P-doping on the physical and electrochemical properties of carbon", J. Mater. Chem., 2012, 22, pp. 12107-12115.

Panja et al., "Nitrogen and phosphorus co-doped cubic ordered mesoporous carbon as a supercapacitor electrode material with extraordinary cyclic stability", J. Mater. Chem. A, 2015, 3, pp. 18001-18009 (Abstract only).

Shi et al., "Nitrogen and Phosphorous Co-Doped Carbon Nanodots as a Novel Fluorescent Probe for Highly Sensitive Detection of $Fe^{3+}$ in Human Serum and Living Cells", ACS Appl. Mater. Interfaces, 2016, 8(17), pp. 10717-10725 (Abstract only).

* cited by examiner

NITROGEN AND PHOSPHORUS CO-DOPED CRYSTALLINE CARBON MATERIALS

BACKGROUND OF THE INVENTION

1. Field of the Invention

The present invention relates to carbon materials, and particularly to nitrogen and phosphorus co-doped crystalline carbon materials that are synthesized by a facile, template-free method and exhibit high crystallinity.

2. Description of the Related Art

Carbon exists in three major forms, namely, graphite, amorphous carbon, and diamond. Each of these three forms of carbon varies in structure and bonding, specifically with respect to the carbon-carbon bond. Individually, the amorphous carbon has no crystal structure and is often considered as an impure form of carbon when compared with graphite or diamond. The typical examples of amorphous carbon include, for example, coal and soot. Graphite is a native crystalline form of carbon, which naturally exists in metamorphic and igneous rocks. Graphite is a soft, black, and highly pure form of carbon. Structurally, it consists of sheets of covalently bonded carbon atoms in layers that are held together with weak van der Waals interactions between the carbon planes. The third major polymorph of carbon is diamond. Diamond is composed of carbon atoms bonded to each other in a three dimensional face-centered crystalline cubic structure.

In addition to these three forms of carbon, buckminsterfullerene ($C_{60}$), single sheets of graphite (known as graphene), and nano forms of carbon, such as single wall carbon nanotubes (CNTs) or multiwall carbon nanotubes (MW-CNTs), are also polymorphs of carbon that are widely used in a number of applications. Activated carbon, another carbon polymorph, is a crude form of graphite with an amorphous structure, which has a very high surface area and also has a wide range of industrial applications.

Recently, it has been found that doping carbon with a heteroatom, e.g., nitrogen (N), Sulfur (S), Phosphorus (P), and/or Boron (B), can significantly improve the performance of resulting Carbon Materials (CMs). Various such materials can be used in a wide range of applications in environmental treatment ($CO_2$ adsorption), catalysis, and electrochemistry. In particular, nitrogen-doped CMs are receiving growing attention due to their excellent catalytic performance for Oxygen Reduction Reactions (ORR), which is one of the most important energy-consuming and kinetically less favorable reactions in the power generation mode of a fuel cell. More recently, it has been reported that some of the heteroatom-doped carbon materials, for example, Nitrogen-doped CM, Nitrogen- and Oxygen-doped CM, and Nitrogen- and Phosphorus-doped CM, exhibited facile catalytic activities of water oxidation/Oxygen Evolution Reaction (OER). The heteroatom-doped carbon materials have also been explored for electrochemical energy storage devices, such as secondary batteries (rechargeable) and supercapacitors.

In order to make the best use of CMs for advanced energy applications (energy conversion and energy storage), much effort has been focused on the synthesis of desired heteroatom-doped CMs with controlled structure and texture, morphology, high surface area, high level of graphitization, large pore volume, and doping CM with desired heteroatom(s) (single or co-doped CM). However, except for a few new carbon sources, most of the currently available starting precursors for CM synthesis are limited to only a few conventional sources, such as naturally occurring carbon sources (wood, lignite, coal and some other petroleum based materials), cellulosic materials, and a few synthetic polymeric materials. For example, human hair has been successfully used as a natural precursor to synthesize nitrogen and sulfur co-doped CMs with high surface area, high electrical conductivity, and facile catalytic efficiency for sluggish ORRs in fuel cells. Similar to human hair, chicken feather, which is a biopolymer waste from the poultry industry, has also been successfully processed to synthesize nitrogen-doped carbon materials.

The major advantage of biopolymer-based starting precursors is the high concentration of intrinsic nitrogen and carbon content, which upon annealing, produces nitrogen-doped carbon materials in high yields. In order to achieve the desired concentration of heteroatom-doped carbon materials with desired functionalities, surface characteristics, and potential applications, a number of organic compounds, such as organic ionic dyes, organic ionic salts, and simple organic precursors (added with some nitrogen, phosphorus or sulfur dopant) have been explored by simple carbonization in a controlled environment to produce heteroatom-doped carbon materials. However, synthesizing heteroatom-doped CMs from each of these precursors, and the respective methods used to process them, have their own constraints and limitations.

To date, most of the attempts to synthesize heteroatom-doped carbon materials remain focused on exploiting new starting precursor materials and the properties of heteroatom-doped carbon materials. Therefore, heteroatom-doped carbon materials are typically formed entirely dependent on the nature of the starting precursor and carbonization temperature. In particular, some of the important characteristics of heteroatom-doped carbon materials, such as surface area, porosity, degree of graphitization, and concentration of dopant, heavily depend on the carbonization temperature to a large extent. Also, the structural characteristics, such as crystalline or amorphous nature of the heteroatom-doped carbon material, show a high dependency on the carbonization temperature in most of the previous reports.

Many of the existing methods of heteroatom doping of crystalline carbon materials use either a hard template (such as silica) or soft templates (eutectic mixtures of metal salts) to obtain the crystalline phase. However, it is very difficult to completely remove the template. Some studies have shown that crystalline carbon materials prepared using soft templates still contain a residue of metal ions, which may alter structural and electronic properties of the active sites of these carbon materials. Since both hard and soft templates can reside in ppm levels in the final doped product, there is a need for a facile, template-free process for synthesizing heteroatom-doped crystalline carbon materials.

Thus, nitrogen and phosphorus co-doped crystalline carbon materials solving the aforementioned problems are desired.

SUMMARY OF THE INVENTION

The nitrogen and phosphorus co-doped crystalline carbon materials are prepared by a template-free method that includes pyrolyzing a precursor mixture including a carbon source, a nitrogen source, and a phosphorus source. The method involves mixing known amounts of the precursor components, dissolving the precursor mixture in deionized water, distilling solvent from the aqueous mixture, and vacuum drying the residue to a dry solid mixture. The mixture is then carbonized by pyrolysis at 900° C. in an argon atmosphere to obtain a nitrogen and phosphorus co-doped crystalline carbon material. The principles of the method are illustrated by a precursor mixture of sucrose, urea, and ammonium dihydrogen phosphate ($NH_4H_2PO_4$). The amount of ammonium salt in the precursor mixture plays a key role in controlling the crystallinity, morphology, and composition of the N/P co-doped crystalline carbon material.

These and other features of the present invention will become readily apparent upon further review of the following specification and drawings.

DETAILED DESCRIPTION OF THE PREFERRED EMBODIMENTS

Figure 1:
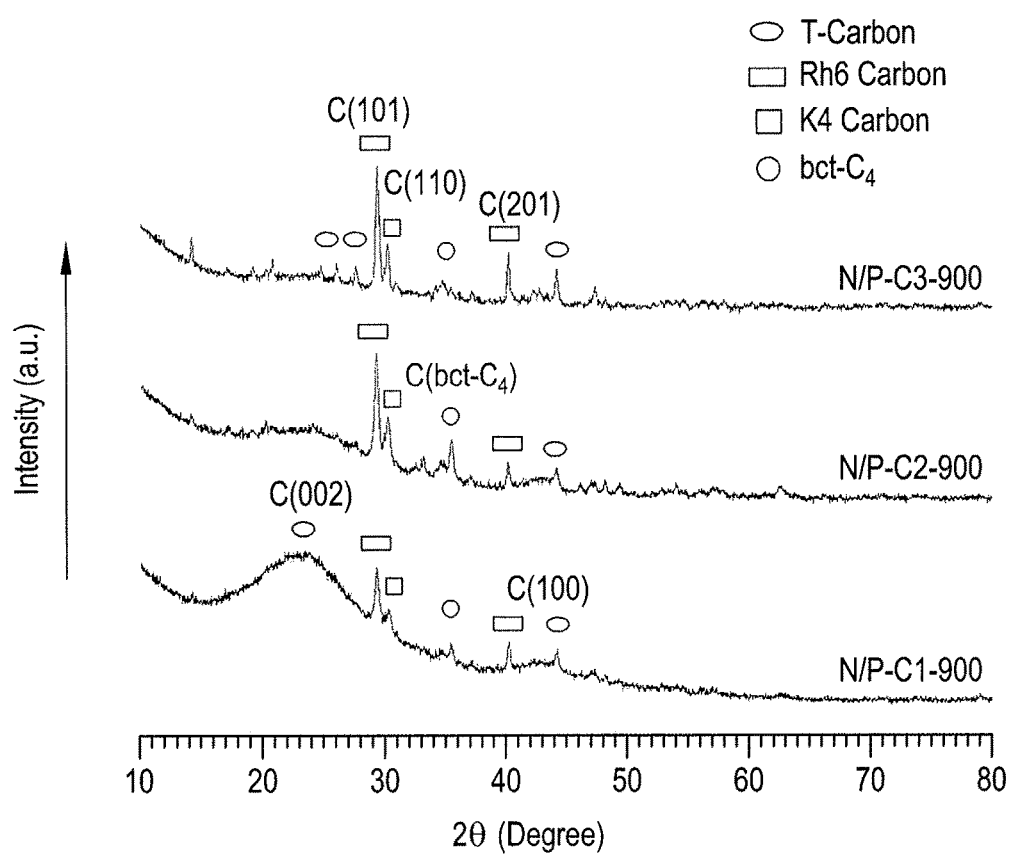
FIG. 1 shows the X-Ray Diffraction (XRD) patterns of three samples of nitrogen and phosphorus co-doped crystalline carbon materials prepared with different urea to phosphate ratios, namely, N/P-C1-900 (3:1 ratio), N/P-C2-900 (1:1 ratio), and N/P-C3-900 (1:3 ratio).

Reference will now be made in detail to embodiments of the present disclosure, examples of which are illustrated in the accompanying drawings. The nitrogen and phosphorus co-doped crystalline carbon materials are prepared by a template-free method that includes pyrolizing a precursor mixture including a carbon source, a nitrogen source, and a phosphorus source. The method involves mixing known amounts of the precursor components, dissolving the precursor mixture in deionized water, distilling solvent from the aqueous mixture, and vacuum drying the residue to a dry solid mixture. The mixture is then carbonized by pyrolysis at 900° C. in an argon atmosphere to obtain a nitrogen and phosphorus co-doped crystalline carbon material. The principles of the method are illustrated by a precursor mixture of sucrose, urea, and ammonium dihydrogen phosphate ($NH_4H_2PO_4$). The amount of ammonium salt in the precursor mixture plays a key role in controlling the crystallinity, morphology, and composition of the N/P co-doped crystalline carbon material. The absence of a hard template (such as silica) or a soft template (eutectic mixture of metal salts) in the synthesis leaves the crystalline carbon material product relatively free of impurities that might otherwise affect the structure and/or electronic properties of the carbon materials.

For purposes of this disclosure, "co-doped" refers to materials doped with at least two heteroatoms, such as, e.g., nitrogen, oxygen, sulfur, phosphorus, chlorine, bromine, and iodine. The term "nitrogen and phosphorus" is used interchangeably with "N/P". The term "ammonium dihydrogen phosphate" is used interchangeably with "$NH_4H_2PO_4$".

The carbon source of the precursor moisture includes at least one carbon source selected from carbohydrates (e.g., sugar, starch, guar gum, acacia gum, etc.), hydrocarbon-based polymers (e.g., PVA, PBI, PS, polythiophenes, etc.), organic dyes (e.g., murexide, methylene blue, methylene red, etc.), organic salts (e.g., EDTA, protic organic ionic salts, aprotic organic ionic salts, etc.), organic wastes (e.g., feathers, hairs, etc.), and hydrocarbons (e.g., wax, etc.). The nitrogen source may be a nitrogen-containing organic or inorganic salt, including urea, thiourea, guanidine, nucleic bases, etc. The phosphorus source can be an ammonium-based, phosphorus-containing organic or inorganic salt, including ammonium dihydrogen phosphate, diammonium phosphate, ammonium hypophosphite, alkylammonium phosphates, etc. The examples described herein employed a precursor mixture of sucrose, urea, and ammonium dihydrogen phosphate. However, the present inventors anticipate that precursor mixtures containing any combination of the carbon, nitrogen, and phosphorus sources described above should produce crystalline carbon materials having similar properties when processed according to the steps of the present method.

Example 1

Synthesis of N/P Co-Doped Crystalline Carbon Material

Briefly, a mixture containing known amounts of sucrose, urea, and ammonium dihydrogen phosphate ($NH_4H_2PO_4$) were first dissolved in deionized water, followed by distillation of the solvent, and vacuum drying the residue overnight to obtain a dry solid mixture. By varying the mass ratio of $NH_4H_2PO_4$ to urea, e.g., (1:3), (1:1) and (3:1), while keeping the amount of carbon precursor (sucrose) the same, three different starting mixtures, (N/P-C1-900, N/P-C2-900 and N/P-C3-900) were prepared. Specifically, N/P-C1-900, N/P-C2-900, and N/P-C3-900 are samples with varying the mass ratios of $NH_4H_2PO_4$ to urea having ratios of (1:3), (1:1), and (3:1), respectively. Each of these mixtures was subject to pyrolysis by carbonizing the precursor at 900° C. in an argon (Ar) environment to obtain the corresponding nitrogen and phosphorus co-doped crystalline carbon materials. The choice of temperature (900° C.) for synthesis of the carbon materials was based on the previous findings of several research studies, which reveal that the product heteroatom doped carbon materials retain high percentage of dopant, as well as achieved high surface area, at this temperature.

Apart from sucrose, which can be used as a carbon precursor for synthesizing the exemplary heteroatom co-doped carbon materials, urea was used to dope nitrogen in the final product (N/P co-doped carbon materials). Similarly, the primary purpose of using the $NH_4H_2PO_4$ was to dope both nitrogen and phosphorus in the carbon structure.

Example 2

XRD Analysis of N/P Co-Doped Crystalline Carbon Material

FIG. 1 shows the XRD patterns of the nitrogen and phosphorus co-doped carbon materials synthesized according to Example 1. The XRD studies of the synthesized N/P co-doped carbon materials (N/P-C1-900, N/P-C2-900 and N/P-C3-900) were carried out to validate the formation of graphitic phases due to carbonization at high temperature, and also to observe the amount of disordered phases created by the heteroatom (N/P) doping. Further, the XRD patterns show the effect of the additive composition (ratio of $NH_4H_2PO_4$ to urea) on the structural alterations in the synthesized N/P co-doped carbon materials. Unlike most heteroatom-doped carbon materials, which exhibit a broad XRD peak (representing highly amorphous carbon phases), the presently synthesized N/P co-doped carbon materials contain a number of sharp XRD peaks, which exhibit the presence of various crystalline phases of carbon. The XRD patterns of the present N/P co-doped carbon materials are very different from the nitrogen-doped, sulfur-doped, nitrogen/phosphorus co-doped, or nitrogen/sulfur co-doped carbon materials previously discovered.

In particular, FIG. 1 shows the XRD pattern for N/P-C1-900 has one broad diffuse band centered around 23° at Bragg angle 2θ, and one relatively less broad band with a superimposed peak ca. 43.8° 2θ, which are associated with the (002) and (100) lattice planes of a typical less ordered and/or Turbostratic carbon (T-Carbon), respectively. The T-carbon is generally regarded as an analogue of the hexagonal carbon (H-Carbon) with loosely ordered structure, often representing the amorphous form of the graphitic carbon. By varying the mass ratio of urea to $NH_4H_2PO_4$, (3:1) in N/P-C1-900, (1:1) in N/P-C2-900 and (1:3) in N/P-C3-900, a gradual flattening of the broad 23° 2θ peak was observed with increasing amount of $NH_4H_2PO_4$ in the starting precursor mixture for synthesizing the N/P co-doped carbon materials. In particular, the XRD pattern of N/P-C3-900 shows peaks (26° and 28° 2θ), which can be ascribed to fragmented microcrystallites having relatively more ordered structure. This indicates increasing the concentration of $NH_4H_2PO_4$ can develop more crystalline phases in the N/P co-doped carbon materials.

Further, FIG. 1 also shows that the XRD pattern for the N/P-C1-900 sample has some new XRD peaks ca. 30°, 30.8°, 35.5° and 40°, which were not observed or reported for other heteroatom-doped carbon materials. While investigating the origin of these new XRD peaks, it was found that the XRD patterns of the soot obtained from the detonation of TNT/diesel oil revealed the presence of amorphous carbon and several crystalline carbon phases. In particular, it was found that a sharp diffraction peak ca. 30° in the XRD pattern of the detonation soot could not be assigned to any known carbon allotropes, such as graphite, diamond, or fullerenes. This sharp XRD peak was also observed in fullerene soot and chimney soot, but remained unidentified until recently when researchers discovered a new carbon allotrope with six-fold helical chains in all, having alternating single and double bonds containing $sp^2$ bonding networks, which provided an excellent match to this previously unidentified carbon phase with a sharp diffraction peak ca. 30°. This new carbon phase has a 6-atom rhombohedral primitive unit cell, and thus is termed as rh6 carbon.

FIG. 1 also shows that the XRD patterns of the N/P co-doped materials (N/P-C1-900, N/P-C2-900, and N/P-C3-900) display a prominent XRD peak ca. 30° 2θ, which can be ascribed to the (101) plane of the rh6 carbon phase. The XRD patterns of these materials also show another concomitant XRD peak with relatively lower intensity ca. 40° 2θ, which is also characteristic to this carbon phase. The XRD patterns shown in FIG. 1 exhibit a clear trend of increasing intensity of rh6 diffraction peaks when going from N/P-C1-900→N/P-C2-900→N/P-C3-900. This indicates that the ratio of additives (Urea/$NH_4H_2PO_4$) has a significant effect on the formation of crystalline phases in these novel N/P co-doped catalyst materials. In fact, N/P-C3-900, which was prepared by the carbonization of a mixture containing Urea/$NH_4H_2PO_4$, (1:3) in carbon precursor (sugar), achieved more crystalline phases than the N/P-C1-900 and N/P-C2-900 catalyst materials.

FIG. 1 shows another XRD peak ca. 30.8° 2θ on the shoulder of rh6 carbon, which was common in all of the N/P co-doped carbon materials. This peak corresponds to the relatively less stable $sp^2$ hybridized carbon having three-dimensional (3D) crystal structure (K4). Although the K4 carbon is dynamically unstable, it still shows structural stability on the potential energy surface and exhibits excellent metallic properties. The XRD patterns of all of the N/P co-doped carbon materials show another common peak ca. 35.5° 2θ, which best matches with the diffraction peak of body-centered tetragonal carbon, termed as bct-C4. In contrast to all $sp^2$ carbon phases (T-carbon, rh6, and K4), the bct-C4 is a form of crystalline $sp^3$ carbon, and its structure seems to be an intermediate between graphite and hexagonal carbon.

The XRD studies of N/P-C1-900, N/P-C2-900 and N/P-C3-900 revealed the presence of four different carbon phases in the newly synthesized N/P co-doped carbon materials. Specifically, the comparison of the diffraction patterns of these carbon materials indicates that the higher concentration of $NH_4H_2PO_4$ in the starting precursor mixture induced more crystalline phases in these N/P co-doped carbon materials.

Example 3

Surface Area Analysis of N/P Co-Doped Crystalline Carbon Material

Figure 2A:
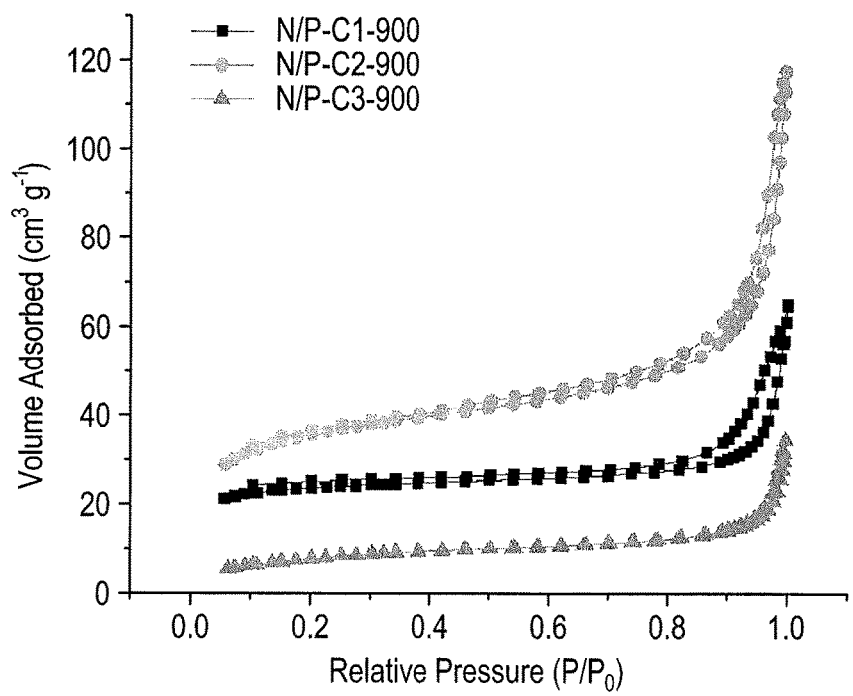
FIG. 2A is a plot showing a Brunauer-Emmett-Teller (BET) characterization of $N_2$ adsorption-desorption isotherms for N/P-C1-900, N/P-C2-900, and N/P-C3-900.

FIG. 2A shows the BET characterization of $N_2$ adsorption-desorption isotherms for N/P-C1-900, N/P-C2-900, and N/P-C3-900. The shape of all three isotherms are similar to Type IV (according to IUPAC classifications) with clear hysteresis loops extending from P/P0=0.8 to ca. 0.99, indicating the coexistence of mesopores (pore diameter <50 nm) and macropores (pore diameter >50 nm) in these materials. The BET specific surface areas (SBET) of N/P-C1-900, N/P-C2-900 and N/P-C3-900 were found to be 74, 117 and 29 $m^2g^{-1}$, respectively. Since, all the samples were heated at the same pyrolysis temperature (~900° C.), the differences in the SBET of the obtained N/P co-doped carbon materials indicate that the mass ratio of urea to $NH_4H_2PO_4$ in the starting mixture may have resulted in varying surface areas exhibited by these materials.

Figure 2B:
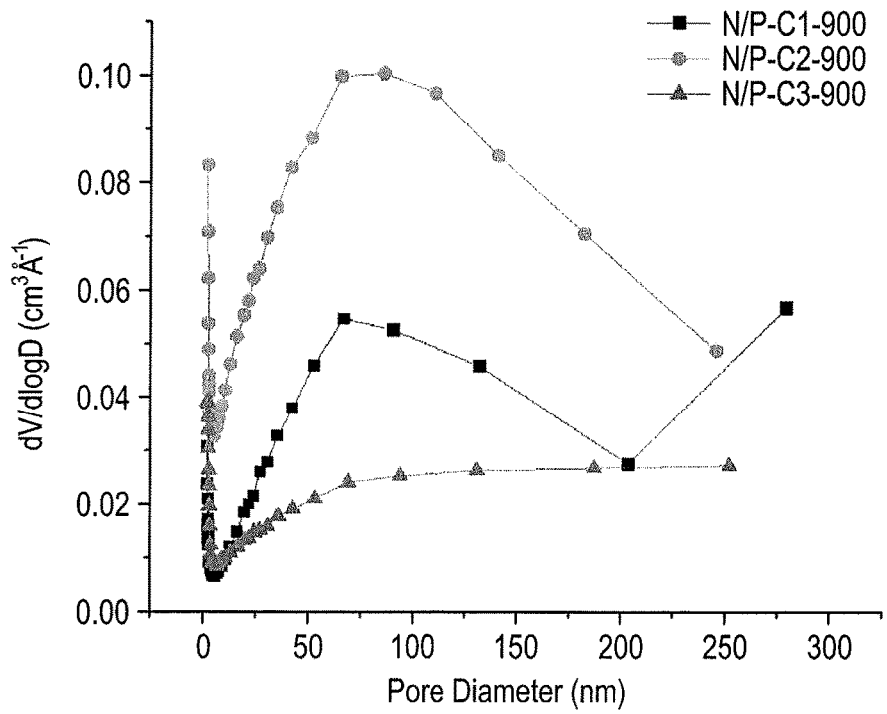
FIG. 2B is a [plot showing Barrett-Joyner-Halenda (BHJ) pore size distribution for N/P-C1-900, N/P-C2-900, and N/P-C3-900.

The distribution of different pore sizes in these carbon materials was investigated from the BJH pore size distribution (PSD) curves shown in FIG. 2B. The PSD curves for N/P-C1-900 and N/P-C2-900 showed a peak around 68 nm, indicating similar pore diameter distribution and the presence of macropores in these two carbon materials. In contrast, the PSD curve for N/P-C3-900 in FIG. 2B did not show any prominent peak and was unable to provide any information about the pore size distribution in this carbon material.

Example 4

Morphological Analysis of N/P Co-Doped Crystalline Carbon Material

Figure 3A:
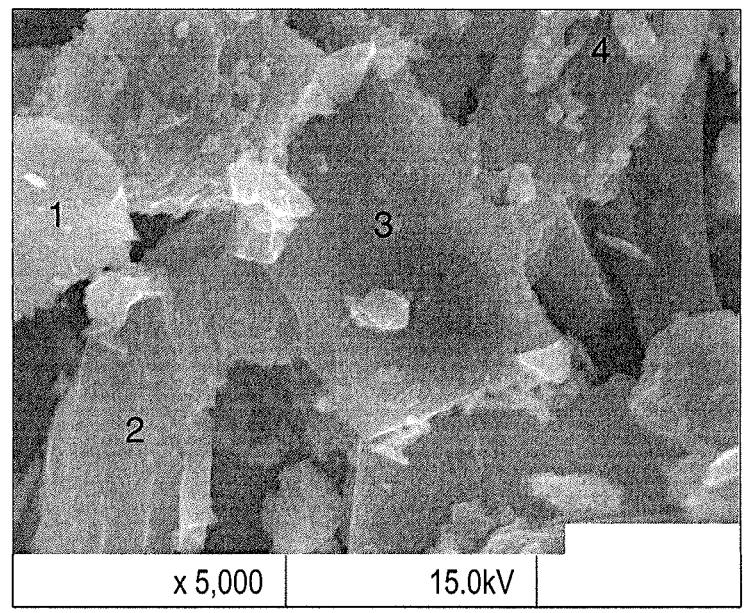
FIGS. 3A, 3B, and 3C show Field Emission Scanning Electron Microscopy (FESEM) micrographs of sample N/P-C1-900 at 1 μm with magnifications of ×5,000, ×10,000, and ×7,500, respectively.
Figure 3B:
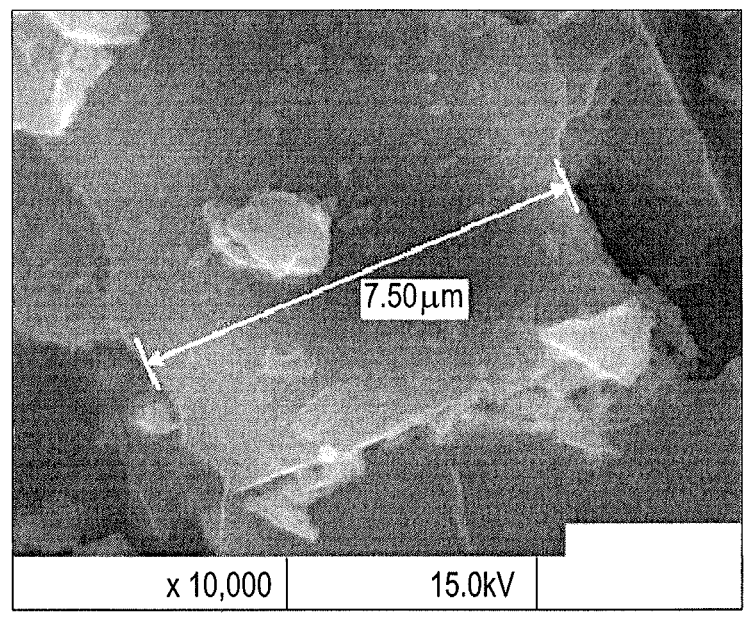
Figure 3C:
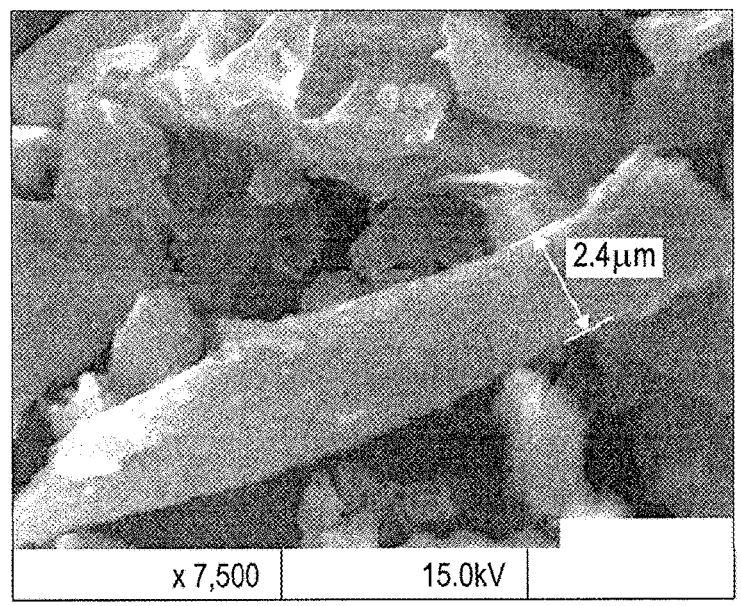
Figure 3D:
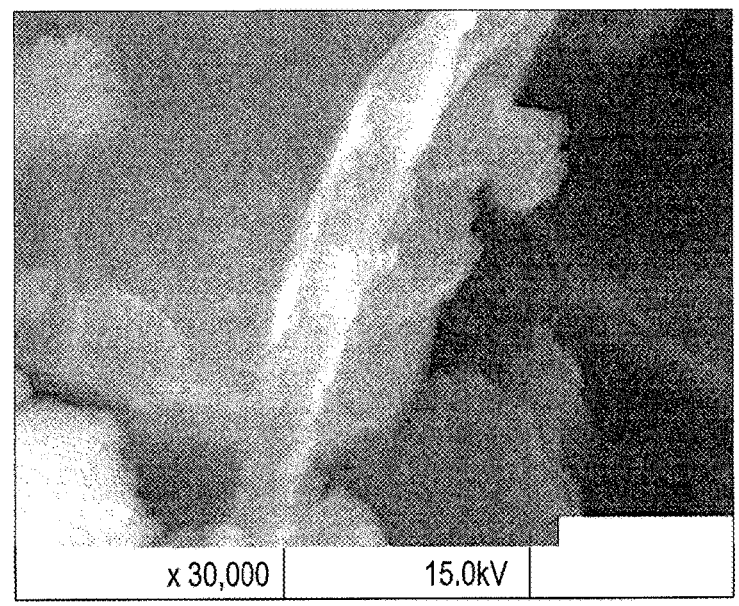
FIG. 3D shows an FESEM micrograph of sample N/P-C1-900 at 100 nm with magnification of ×30,000.

The surface features/morphology of the synthesized N/P co-doped carbon materials were investigated using field emission scanning electron microscopy (FESEM). FIGS. 3A-3D, 4A-4B, and 5A-5D show the FESEM images of the N/P-C1-900, N/P-C2-900 and N/P-C3-900 materials, respectively. In particular, the FESEM images of N/P-C1-900 (shown in FIGS. 3A-3D) and N/P-C2-900 (shown in FIGS. 4A-4B) exhibit morphological patterns that include solid log/rod like microstructures and uneven/irregular shaped particles embedded on the rods. A closer look at FESEM image of N/P-C1-900 in FIG. 3A reveals different varieties of the microstructured carbon rods with: a sliced structure (1); open edges (1, 2, 3, and 4); different sizes; and displaying both smooth (3) and wrinkled surfaces (2). In particular, FIG. 3B shows a rod like structure with a uniform diameter of 7.50 µm, while FIG. 3C shows a microstructured rod having non-uniform diameter (thin part ~2.4 µm) with a wrinkled surface. The high magnification FESEM image of N/P-C1-900 shown in FIG. 3D shows a carbon rod having diameter in the range of 200-300 nm, while a carbon rod with a much larger diameter can also be seen in the rear.

Figure 4A:
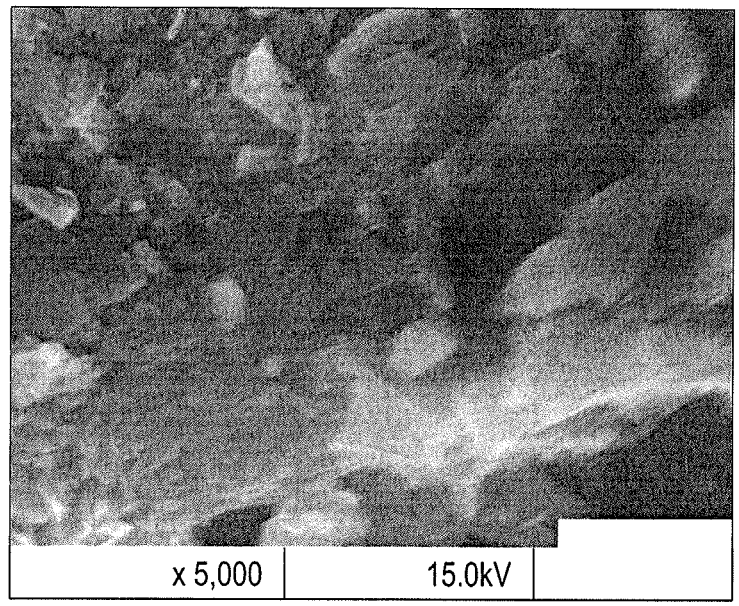
FIGS. 4A and 4B show FESEM micrographs of sample N/P-C2-900 at 1 μm with magnifications of ×5,000 and ×3,000, respectively.
Figure 4B:
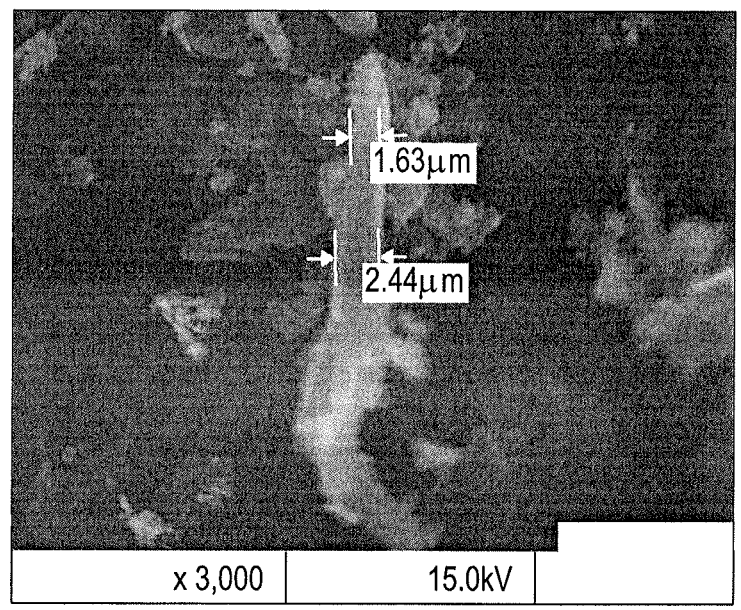

The morphological patterns of sample N/P-C2-900 are shown in FIGS. 4A and 4B. Specifically, FIGS. 4A and 4B show some resemblance to the structures shown by the N/P-C1-900 sample in FIGS. 3A-3D, with broken structures and microstructured rods. For example, FIG. 4B displays a typical non-uniform structured carbon rod having a diameter of about 1.63 and 2.44 µm at two different points. It is important to note that the N/P co-doped carbon materials shown herein were synthesized without using any soft or hard templates. Therefore, the morphological patterns displayed by these materials are novel and unique in terms of their originality due to their template free synthesis.

Figure 5A:
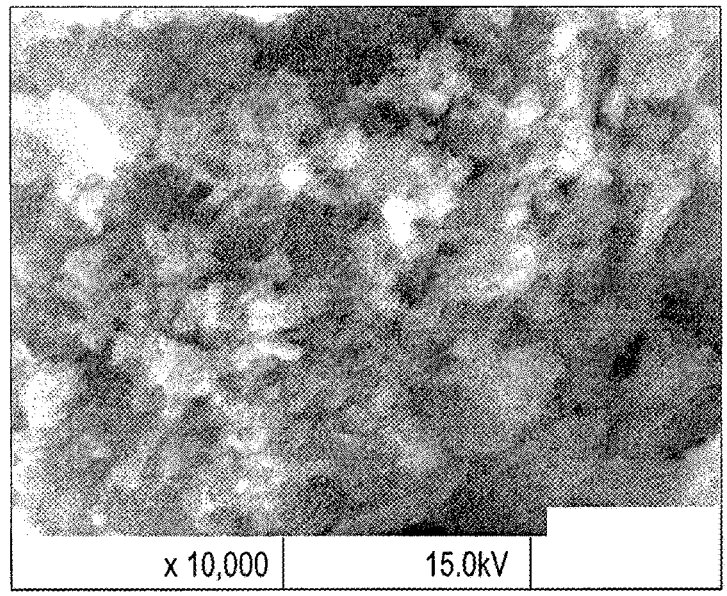
FIGS. 5A, 5B, and 5C show FESEM micrographs of sample N/P-C3-900 at 1 μm with magnifications of ×10,000, ×5,000, and ×10,000, respectively.
Figure 5B:
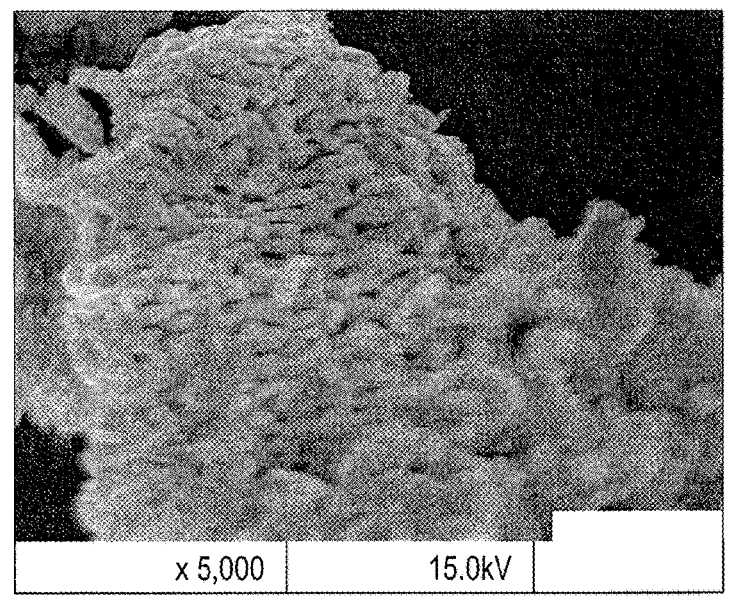
Figure 5C:
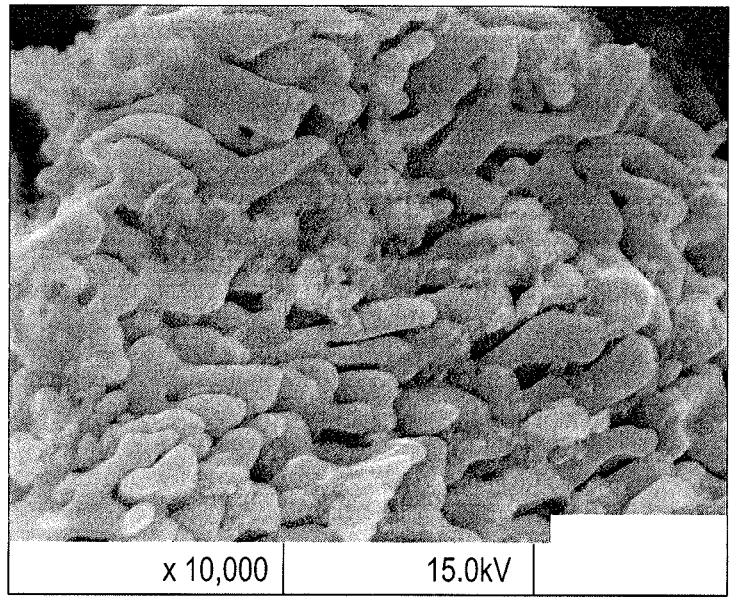
Figure 5D:
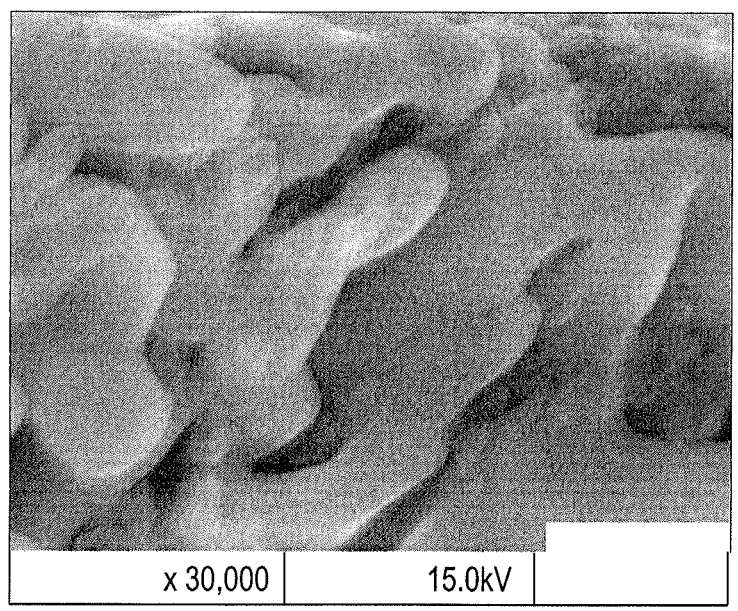
FIG. 5D shows an FESEM micrograph of sample N/P-C3-900 at 100 nm with magnification of ×30,000.

In contrast to N/P-C1-900 and N/P-C2-900, the FESEM images of N/P-C3-900 shown in FIGS. 5A-5D reveal a very different and novel coral-shaped morphology. Specifically, the FESEM image in FIG. 5A shows two major kinds of structures in N/P-C3-900, namely, microstructured flakes and randomly distributed spherically shaped particles. A closer inspection of the spherically shaped cluster in FIGS. 5B-5D show a unique and novel smooth surface, coral shaped morphology. At a higher magnification (10,000×), shown in FIG. 5D, small particles in the range of 100-200 nm are randomly distributed on the coral surface.

Example 5

XPS Analysis of N/P Co-Doped Crystalline Carbon Material

Figure 6A:
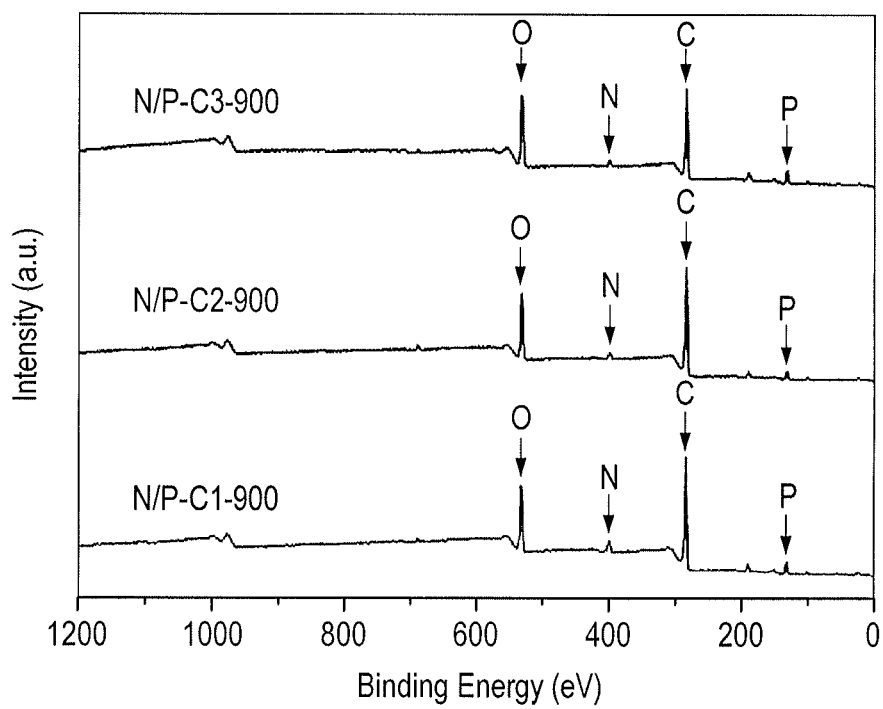
FIG. 6A is a comparison of X-ray Photoelectron Spectroscopy (XPS) survey spectra of samples N/P-C1-900, N/P-C2-900, and N/P-C3-900.

FIG. 6A shows the XPS survey spectra of N/P-C1-900, N/P-C2-900, and N/P-C3-900. In FIG. 6A, the typical XPS survey scans for N/P-C1-900, N/P-C2-900, and N/P-C3-900 indicate the presence of peaks corresponding to $N_{1s}$, $P_{2p}$, $C_{1s}$ and $O_{1s}$ in each of these carbon materials. The corresponding amounts of nitrogen, phosphorus, carbon, and oxygen (at %), as determined from the core-level XPS spectra of these sample materials, are provided in Table 1.

TABLE 1

| XPS spectra results | | | | |
|---|---|---|---|---|
| Sample ID | $N_{1s}$ (at %) | $P_{2p}$ (at %) | $C_{1s}$ (at %) | $O_{1s}$ (at %) |
| N/P-C1-900 | 5.04 | 5.66 | 70.69 | 16.72 |
| N/P-C2-900 | 3.13 | 4.27 | 73.06 | 17.39 |
| N/P-C3-900 | 3.09 | 7.58 | 64.96 | 22.34 |

The XPS spectra of these materials show peaks for C (arising mainly from sugar precursor), N (arising mainly from urea precursor), P (arising mainly from $NH_4H_2PO_4$ precursor) and O (both from sugar and $NH_4H_2PO_4$ precursors). It has been reported that urea can be successfully used to achieve nitrogen doping in carbon materials (NDCMs). However, the use of an ammonium-based phosphate salt (such as $NH_4H_2PO_4$) has not been reported to date. From Table 1, it can be clearly seen that the atomic percentage of doped nitrogen content in N/P-C1-900, N/P-C2-900, and N/P-C3-900 subsequently decreased from 5.04% to 3.13% to 3.09%, respectively, in accordance with the decreasing amount of the urea precursor used for synthesizing the N/P co doped carbon materials.

However, upon comparing the atomic percentage of phosphorus content in the N/P co-doped carbon materials, the N/P-C3-900 achieved the highest amount of doped phosphorus (7.58%), since N/P-C3-900 had the highest mass ratio of $NH_4H_2PO_4$ to urea (3:1) used in the preparation of this carbon material. The atomic percentage of doped phosphorus content in N/P-C1-900 and N/P-C2-900 was 5.66% and 4.27%, respectively, which was not consistent with the mass ratio of $NH_4H_2PO_4$ to urea used in the preparation of these sample materials. One possible reason behind this inconsistency could be the competing phenomenon of nitrogen doping while annealing at high temperatures, where both the urea precursor and the ammonium ion ($NH_4^+$) from $NH_4H_2PO_4$ act as the nitrogen dopant and could compete in doping phosphorus in the dual N/P co-doped carbon systems. Apart from N and P, a consistent increase in the amount of doped oxygen (at %) was also observed in N/P co-doped carbon materials with increasing mass ratio of $NH_4H_2PO_4$ to urea. Table 1 shows that the atomic percentage of oxygen in N/P-C1-900, N/P-C2-900 and N/P-C3-900 was 16.72%, 17.39 and 22.34%, respectively.

Figure 6B:
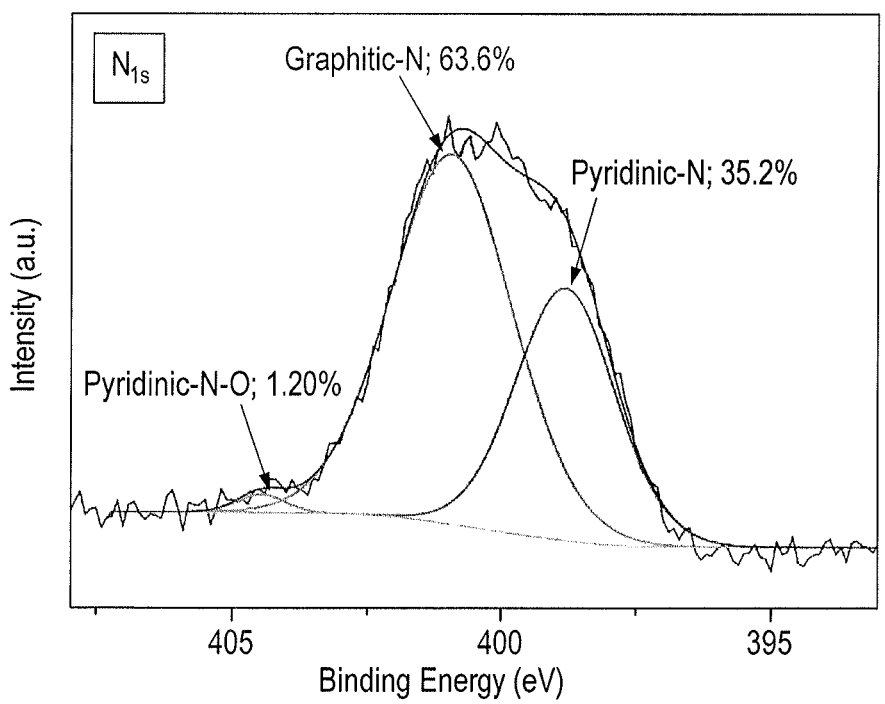
FIGS. 6B, 6C, and 6D are high resolution XPS spectra of the deconvoluted and fitted $N_{1s}$ component in the XPS spectra of samples N/P-C1-900, N/P-C2-900, and N/P-C3-900, respectively.
Figure 6C:
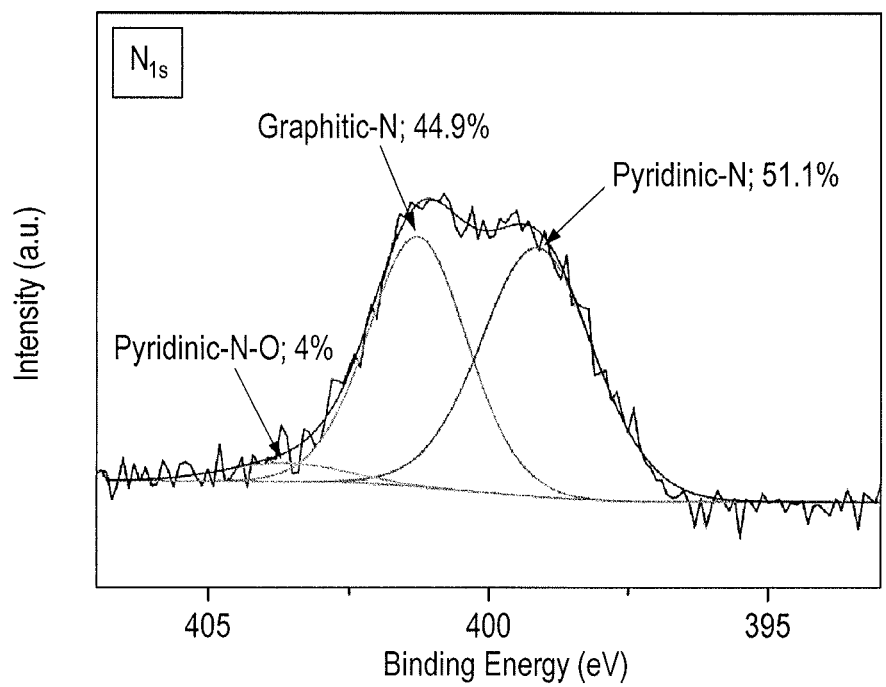
Figure 6D:
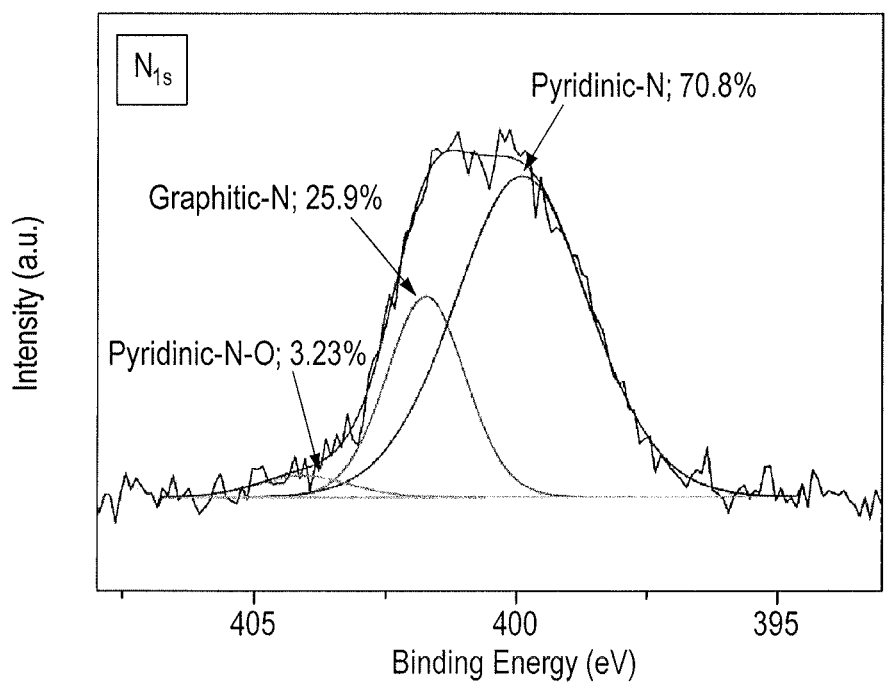

FIGS. 6B-6D show high resolution XPS spectra of the deconvoluted and fitted $N_{1s}$ component in the XPS spectra of (b) N/P-C1-900, (c) N/P-C2-900, and (d) N/P-C3-900. To identify the types of nitrogen functionalities, the deconvolution of $N_{1s}$ region in the XPS survey spectra of N/P-C1-900, N/P-C2-900 and N/P-C3-900 was performed and fitted with three component peaks centered at about 398.8 eV, 401.2 eV, and 404 eV. Each of these peaks are attributed to pyridinic-N, quaternary-N (or graphitic-N), and oxidized pyridinic-N (labelled as pyridinic-N—O), respectively.

These nitrogen functionalities create different chemical and electronic environments with their neighboring carbon atoms, and therefore play different roles in the electrocatalytic properties of N/P co-doped carbon materials. Previous reports on the development of nitrogen-doped carbon materials for their potential application as an electrocatalyst for oxygen reduction reaction (ORR) reveal that high proportions of the pyridinic-N and quaternary-N in the nitrogen-doped carbon material can be advantageous for the ORR. These two types of nitrogen functionalities not only provide active sites for the ORR, but also provide high stability during long-term catalytic reaction in a fuel cell. More recently, it has been reported that the carbon atoms adjacent to the pyridinic-N display high Lewis basicity, and therefore provide more active sites for ORR.

In this regard, for N/P-C1-900, the deconvoluted $N_{1s}$ spectrum shown in FIG. 6B reveals that this carbon material achieved a higher proportion of graphitic-N (63.6%) compared to pyridinic-N (35.2%). In addition, a small proportion of pyridinic-N—O (1.2%) was also present in this carbon material. In the case of N/P-C2-900, FIG. 6C shows that when compared to the first material (N/P-C1-900), the intensity of the peak corresponding to the graphitic-N decreased significantly (percentage of graphitic-N ~44.9%) compared to the pyridinic-N, which increased to 51.1%. Additionally, N/P-C2-900 also exhibited an increase in the proportion of pyridinic-N—O (4%), which was relatively small in the case of N/P-C1-900.

Interestingly, the relative proportion of graphitic-N to pyridinic-N continued to increase in the third material, N/P-C3-900. FIG. 6D shows a significantly higher proportion of pyridinic-N (70.8%) to graphitic-N (25.9%) in N/P-C3-900. In addition, the percentage of pyridinic-N—O was ~3.23% in this material. The atomic percentage values of pyridinic-N, quaternary-N (or graphitic-N), and pyridinic-N—O, determined from the deconvolution of $N_{1s}$ component in the XPS spectra of N/P-C1-900, N/P-C2-900, and N/P-C3-900 are provided in Table 2.

TABLE 2

Atomic percentage values of pyridinic-N, quaternary-N (or graphitic-N), and pyridinic-N—O

| Sample ID | Pyridinic-N (at %) | Quaternary-N (or graphitic-N) (at %) | Pyridinic-N—O (at %) |
|---|---|---|---|
| N/P-C1-900 | 35.2 | 63.6 | 1.20 |
| N/P-C2-900 | 51.1 | 44.9 | 4 |
| N/P-C3-900 | 70.8 | 25.9 | 3.23 |

Previous reports on the development of N and N/P co-doped carbon materials disclose that the quaternary-N is the most stable nitrogen configuration at high temperatures, and its relative proportion compared to pyridinic-N and other nitrogen configurations increases with higher carbonization temperatures. Since all of the carbon materials (N/P-C1-900, N/P-C2-900, and N/P-C3-900) were carbonized at 900° C., the increasing proportion of pyridinic-N compared to quaternary-N from N/P-C1-900→N/P-C2-900→N/P-C3-900 indicates that increasing the mass ratio of $NH_4H_2PO_4$ to urea in the starting precursor mixture may have a major role in achieving a high proportion of pyridinic-N in these materials. Recently, it has been reported that a high proportion of pyridinic-N and quaternary-N in the nitrogen-doped carbon materials displayed facile Oxygen Evolution Reaction (OER). Hence, the high catalytic activity for OER displayed by the presently synthesized N/P co-doped carbon materials can be attributed to the high proportions of the two types of nitrogen groups. In particular, N/P-C3-900 exhibited the best catalytic activity for OER, and despite having a lower amount of doped nitrogen (3.09%), this may be due to the high proportions of pyridinic-N (70.8%) compared to quaternary-N (25.9%).

Figure 7A:
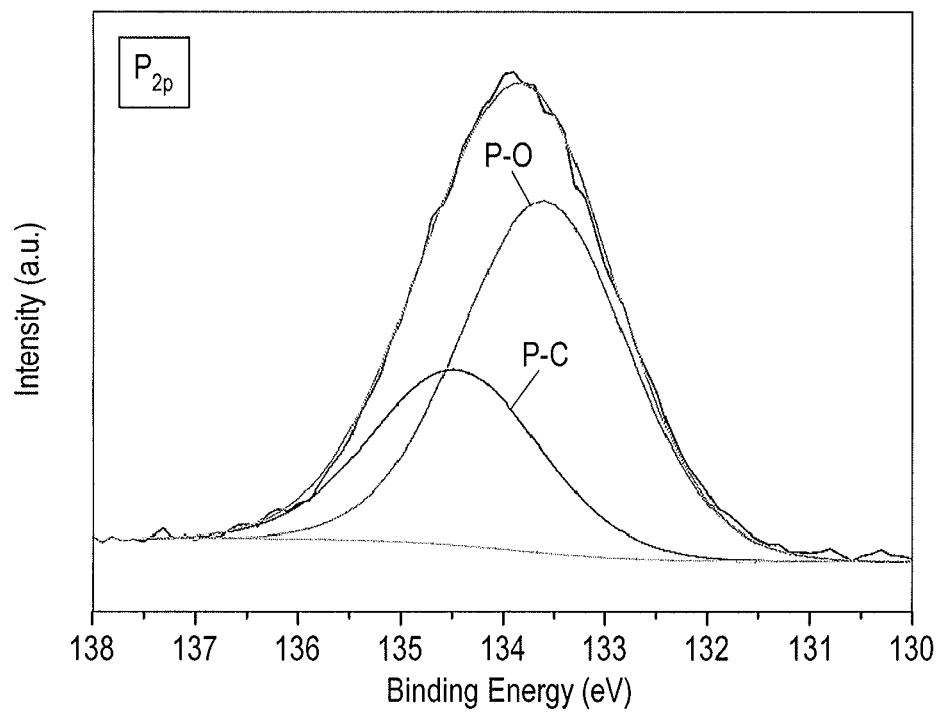
FIGS. 7A, 7B, and 7C are high resolution XPS spectra of the deconvoluted and fitted $P_{2p}$ component in the XPS spectra of samples N/P-C1-900, N/P-C2-900, and N/P-C3-900, respectively.
Figure 7B:
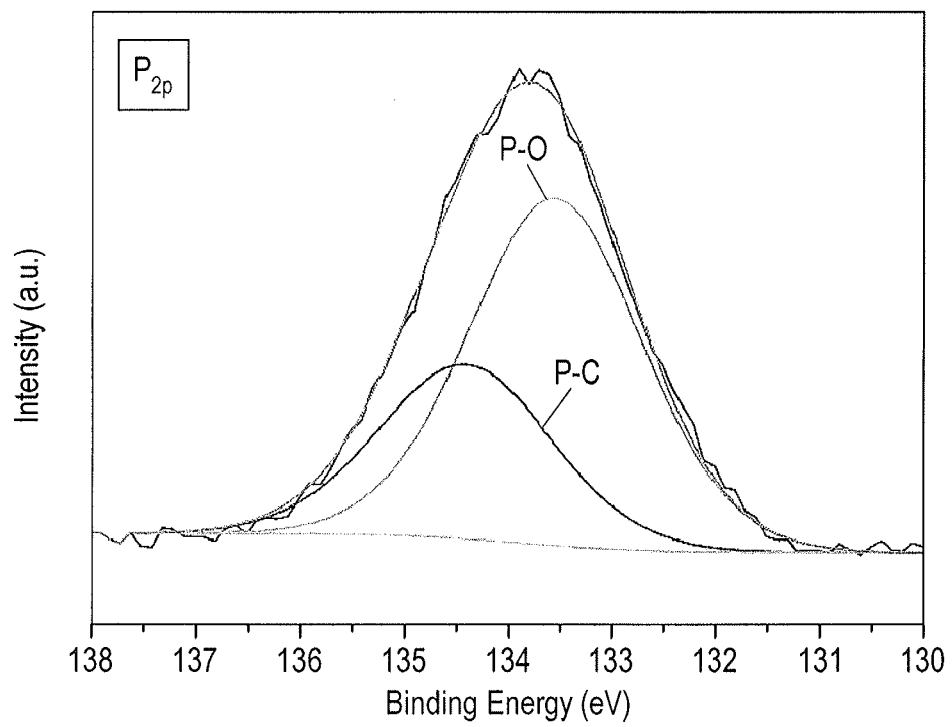
Figure 7C:
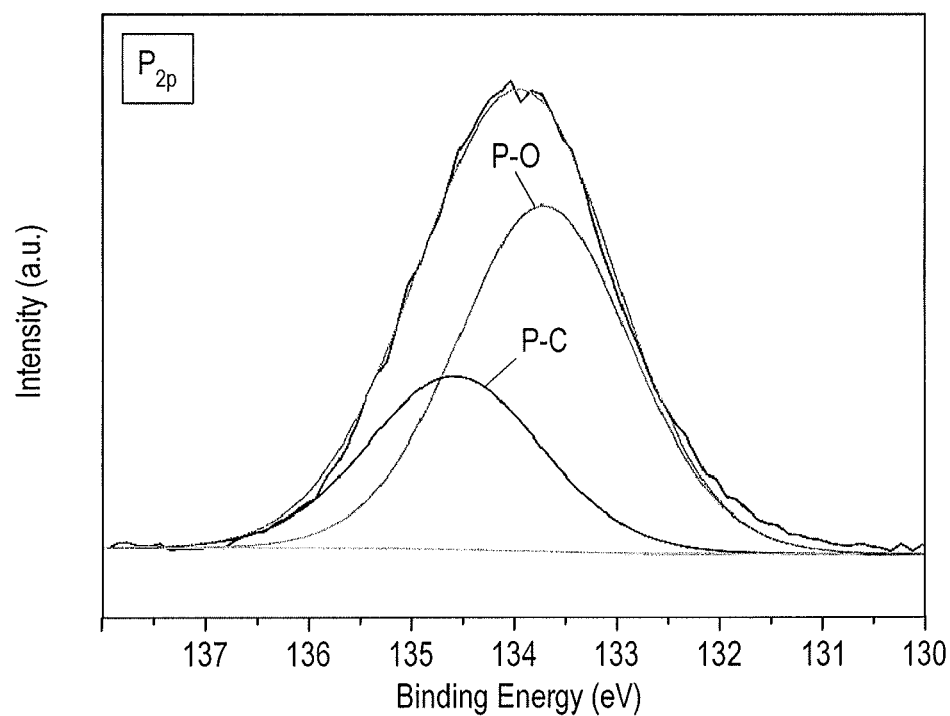

FIGS. 7A-7C show high resolution XPS spectra of the deconvoluted and fitted $P_{2p}$ component in the XPS spectra of (a) N/P-C1-900, (b) N/P-C2-900, and (c) N/P-C3-900. The $P_{2p}$ spectra of N/P-C1-900, N/P-C2-900, and N/P-C3-900 were deconvoluted and fitted with two different bands centered at 133.4 eV and 134.5 eV, corresponding to the P—O and P—C bonds, respectively, in these carbon materials. From Table 1, the surface composition analysis reveals that the oxygen content (at. %) increases with increasing P-doping as we go from N/P-C1-900→N/P-C2-900→N/P-C3-900. Moreover, the deconvoluted and fitted $P_{2p}$ XPS spectra of all of the N/P co-doped carbon materials shown in FIGS. 7A-7C show that the relative proportion of P—O was higher than P—C in all of these materials. This indicates that during thermal pyrolysis, the gradual dehydration and condensation of dihydrogen phosphate groups into polyphosphate may have formed P—O as the dominant bond in these materials. However, it is also possible that these materials physically adsorbed oxygen, primarily because oxygen can easily be adsorbed in the graphite structure, even at low pressure.

It is to be understood that the present subject matter is not limited to the embodiments described above, but encompasses any and all embodiments within the scope of the following claims.

We claim:

1. A method for synthesizing nitrogen and phosphorus co-doped crystalline carbon materials, comprising the step of pyrolizing a template-free precursor mixture containing a carbon source, a nitrogen source, and a phosphorus source at 900° C. in an argon atmosphere, wherein the carbon source comprises at least one carbon source selected from the group consisting of carbohydrates, hydrocarbon-based polymers, organic dyes, organic salts, organic wastes, and hydrocarbons.

2. The method for synthesizing nitrogen and phosphorus co-doped crystalline carbon materials of claim 1, wherein the nitrogen source comprises at least one nitrogen source selected from the group consisting of urea, thiourea, guanidine, and nucleic bases.

3. The method for synthesizing nitrogen and phosphorus co-doped crystalline carbon materials of claim 1, wherein the phosphorus source comprises at least one phosphorus source selected from the group consisting of ammonium dihydrogen phosphate, diammonium phosphate, ammonium hypophosphite, alkylammonium phosphates.

4. The method for synthesizing nitrogen and phosphorus co-doped crystalline carbon materials of claim 1, further comprising the steps of, prior to said pyrolizing step:
   mixing the sources in the precursor mixture;
   providing deionized water to act as a solvent;
   dissolving the precursor mixture in the deionized water to form an aqueous mixture;
   distilling the solvent from the aqueous mixture; and
   vacuum drying residue from the distilling step to a dry, solid precursor mixture.

5. A nitrogen and phosphorus co-doped crystalline carbon material prepared according to the method of claim 4.

6. The method for synthesizing nitrogen and phosphorus co-doped crystalline carbon materials according to claim 1, wherein:
   said carbon source comprises sucrose;
   said nitrogen source comprises urea; and
   said phosphorus source comprises ammonium dihydrogen phosphate.

7. A nitrogen and phosphorus co-doped crystalline carbon material prepared according to the method of claim 6.

8. The method for synthesizing nitrogen and phosphorus co-doped crystalline carbon materials according to claim 6, further comprising the steps of, prior to said pyrolizing step:
  mixing the sources in the precursor mixture;
  providing deionized water to act as a solvent;
  dissolving the precursor mixture in the deionized water to form an aqueous mixture;
  distilling the solvent from the aqueous mixture; and
  vacuum drying residue from the distilling step to a dry, solid precursor mixture.

9. A nitrogen and phosphorus co-doped crystalline carbon material prepared according to the method of claim 8.

10. The method for synthesizing nitrogen and phosphorus co-doped crystalline carbon materials according to claim 8, wherein the precursor mixture has a urea-to-ammonium dihydrogen phosphate mass ratio of 1:3.

11. A method for synthesizing nitrogen and phosphorus co-doped crystalline carbon materials, comprising the step of pyrolizing a template-free precursor mixture containing a carbon source, a nitrogen source, and a phosphorus source at 900° C. in an argon atmosphere, wherein the phosphorus source comprises at least one phosphorus source selected from the group consisting of ammonium dihydrogen phosphate, diammonium phosphate, ammonium hypophosphite, alkylammonium phosphates.

12. A method for synthesizing nitrogen and phosphorus co-doped crystalline carbon materials, comprising the step of pyrolizing a template-free precursor mixture containing a carbon source, a nitrogen source, and a phosphorus source at 900° C. in an argon atmosphere, wherein the carbon source comprises sucrose; the nitrogen source comprises urea; and the phosphorus source comprises ammonium dihydrogen phosphate.

* * * * *